Patented Jan. 9, 1940

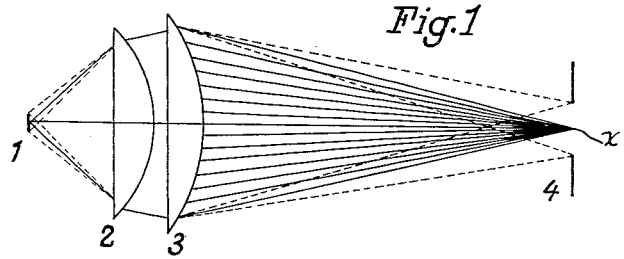
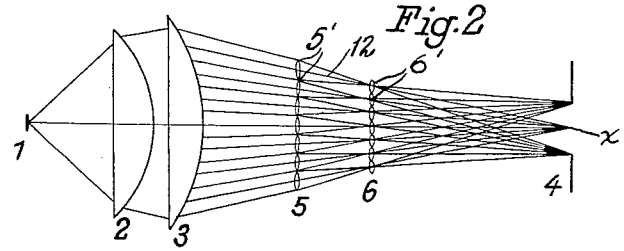
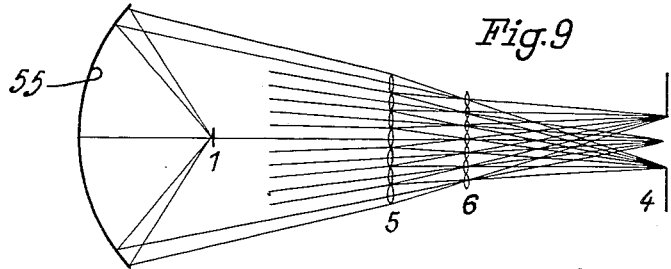
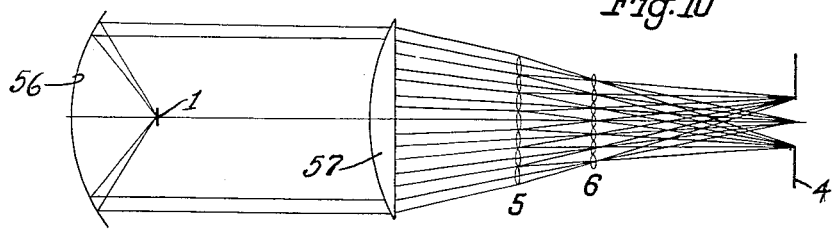
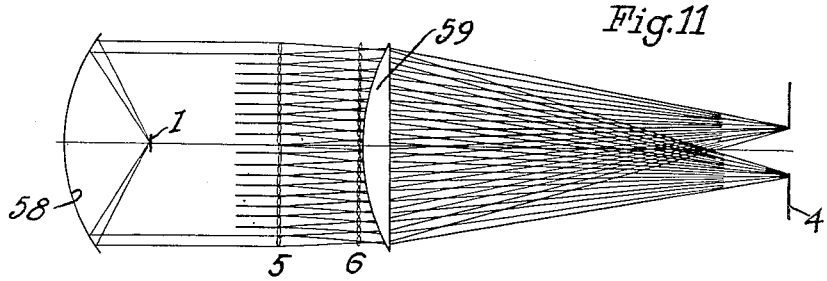

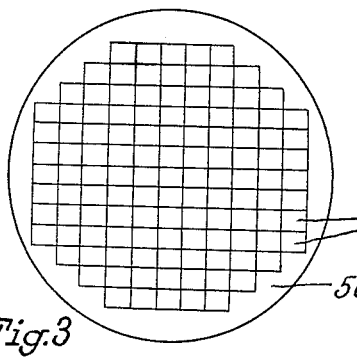
Fig. 3
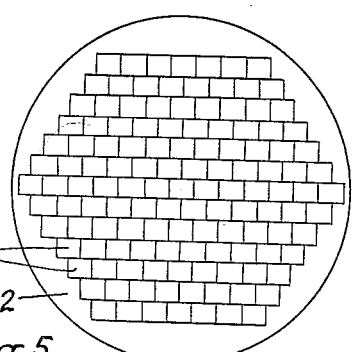
Fig. 5
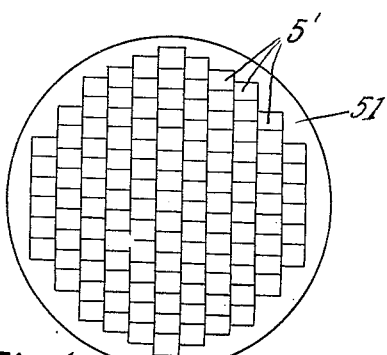
Fig. 4
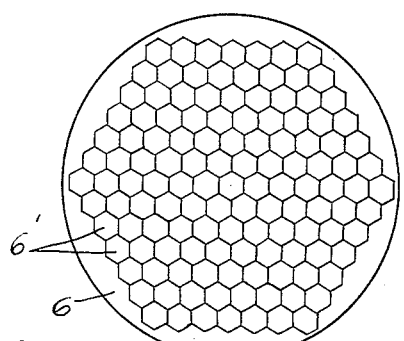
Fig. 6
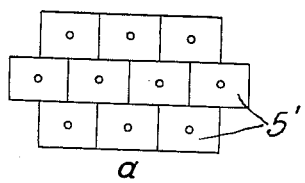
a
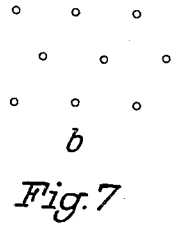
b
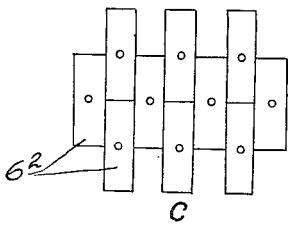
c
Fig. 7
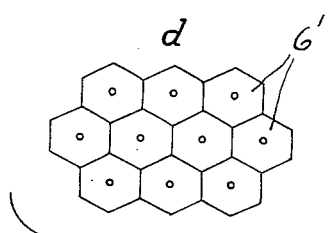
d
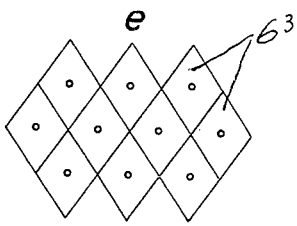
e
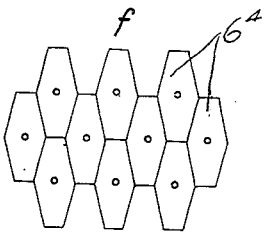
f Jan. 9, 1940.　　　K. RÄNTSCH ET AL　　　2,186,123
ILLUMINATING SYSTEM
Filed Feb. 21, 1938　　　5 Sheets-Sheet 4
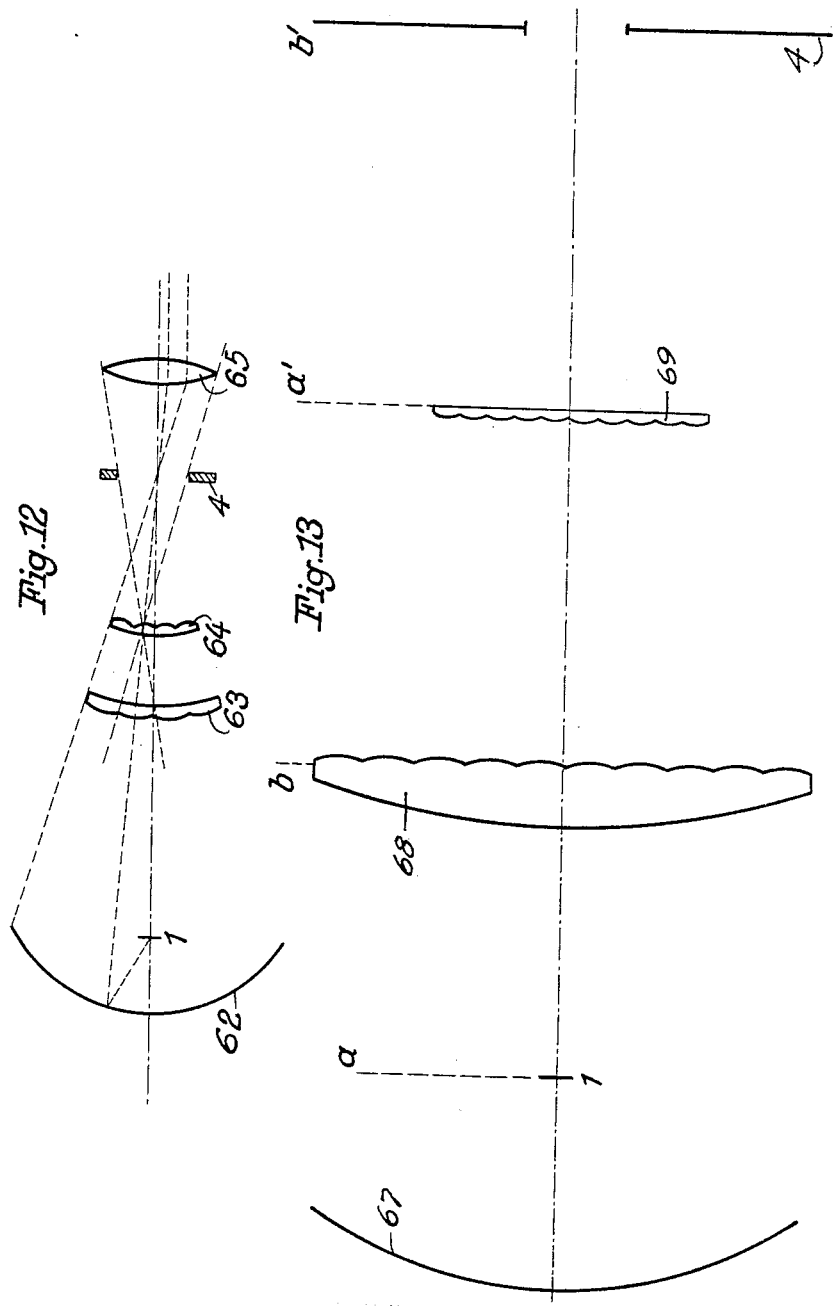

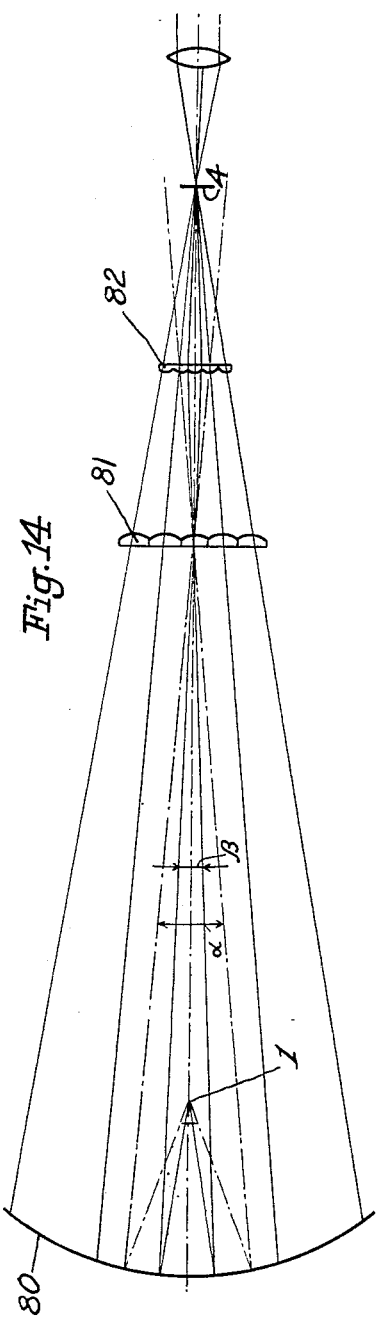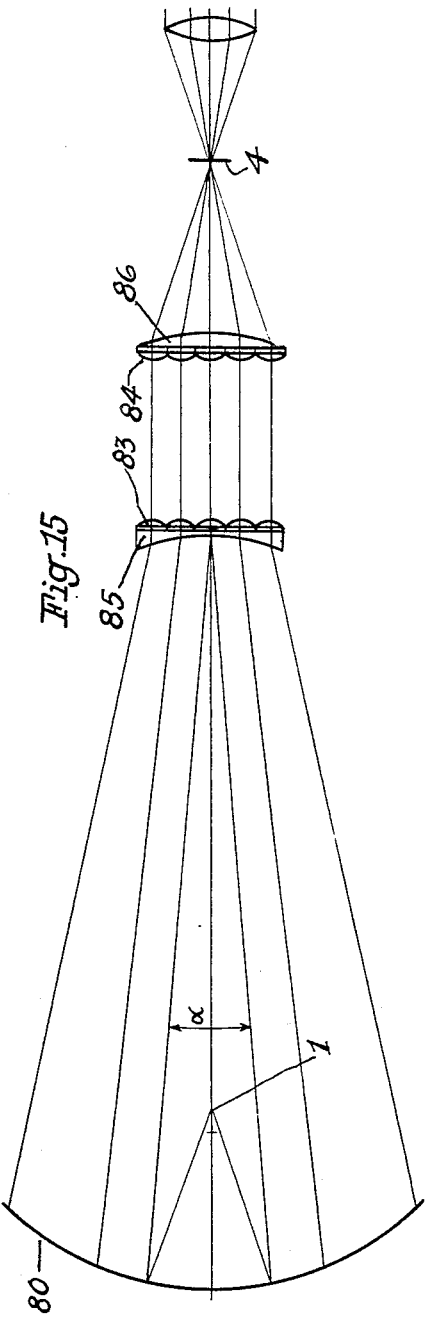

2,186,123

UNITED STATES PATENT OFFICE 2,186,123

ILLUMINATING SYSTEM

Kurt Räntsch, Jena, and Ludwig Bertele, Hans Sauer, and Alfred Merz, Dresden, Germany, assignors to Zeiss Ikon Aktiengesellschaft, Dresden, Germany Application February 21, 1938, Serial No. 191,818
In Germany January 27, 1937

10 Claims. (Cl. 88—24)

This invention relates to lighting equipment intended to be used for projecting purposes, particularly in motion picture work.

The illuminating apparatus for motion picture mechanisms as employed at the present time usually comprises an arrangement whereby a picture of the "effective area" of the course of light is projected by optical means either into the plane of the window for the carrier film of the motion picture, or it is produced within the lens itself of the projecting device. Where the effective area of the source of light is of uniform illuminating power and of sufficient size, a picture of this area is usually reproduced in the plane of the film window. When using an effective area of very small size and of insufficient uniformity, a picture of this area having sufficiently uniform illumination over its entire extent is produced solely within the projecting lens,—a condition which prevails, for instance, when the source of light is furnished by an incandescent lamp.

Occasionally devices slightly modified in form were employed, but the variations did not alter materially the principle of construction.

The efficiency of any of these devices is very low, and even when the picture of the effective area of the source of light is produced in the plane of the film window, it is not always of uniform luminosity. Furthermore, these known devices cannot meet the more exacting requirements as to uniform illumination of the reproduction, wherever special films are to be projected.

The present invention has the object to eliminate the defects inherent to known equipment and to enhance the projection as to uniformity as well as to intensity of illumination.

The invention, therefore, may be described as having the object of producing a film picture of uniform luminosity over its entire area, and of rendering this uniformity independent of the size and of the shape of the area of the source of light employed for projection.

The invention also has the object of greatly enhancing the efficiency of the sources of light for projection inasmuch as the invention adapts itself to any configuration of the area of the source of light and to any configuration of the film window.

The invention also has the object of making the light aperture in the field of the picture uniform in size for all individual or beams of "geometrical" light within the limits presented by the aperture itself. Hence, when this invention is once generally introduced into the film industry, the copies or rental films can be maintained in their operative position in greatly simplified manner, so that the quality of projection is largely improved.

Another object of the invention is to improve the projection of color films, and particularly of films of the "lens screen" type because the invention permits the use of any type of high intensity light source known up to now doing away with the necessity of building special lamps for this purpose.

With these and other objects in view the invention includes the following novel features and details of construction and combination of parts, to be hereinafter described and illustrated in the accompanying drawings and pointed out in the appended claims.

In the drawings:

Fig. 1 illustrates diagrammatically the general arrangement of a projecting equipment as customarily used;

Fig. 2 shows a similar diagram for an equipment of this type making use of lens screens;

Figure 8:
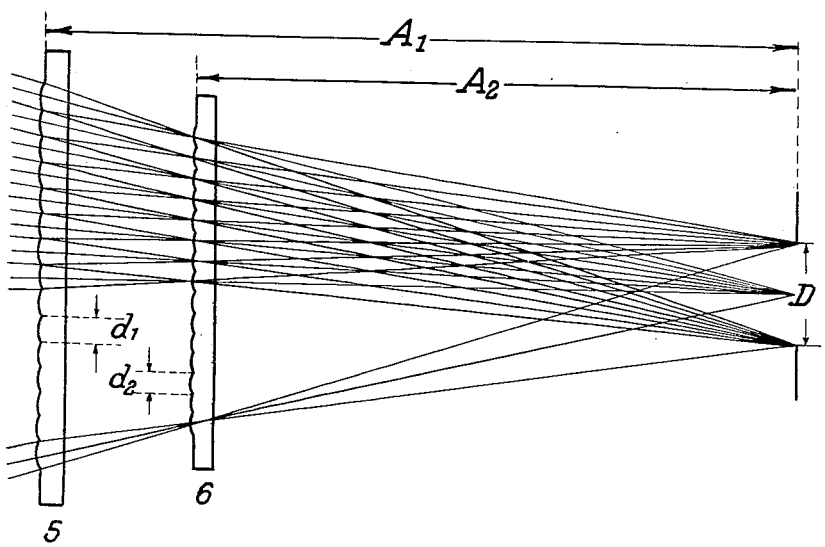

Figs. 3 to 6 inclusive are front views diagrammatically of various types of lens screens;

Fig. 7 comprises a plurality of separate diagrams illustrating various arrangements of lenses on different screens;

Fig. 8 is a diagram of a portion of the equipment for the purpose of computation of the values;

Figs. 9 to 11 illustrate diagrammatically equipments according to the present invention with different reflectors and condensers;

Fig. 12 is a diagrammatical illustration of an equipment of this character with modified lens screens;

Fig. 13 shows a similar diagram with different lens screens, and

Figs. 14 and 15 are similar diagrammatic views of projecting equipment using different lens screens.

Fig. 1 shows diagrammatically the usual illuminating arrangement for motion picture projection. It comprises a lamp, condensers for collecting the light, and a wall with an opening,—the picture window. The effective area of the source of light is indicated at 1, and is hereinafter identified with the source of light. This area is reproduced within the picture window 4 through a compound condenser made up of two lenses 2 and 3. The reproduction is diagrammatically indicated by a plurality of rays of light intersecting within the center point of the picture window, and all emanating from the center point of the effective area 1 of the source of light. This condition shown in full lines for the center point of area 1, applies to every point provided the entire optical equipment is assumed to be an ideal one, free of all defects.

This illuminating device will furnish uniform illumination of the picture window 4 in the plane 4', solely when the effective area 1 of the source of light is of such size that its reproduction extends also fully over the area of the window 4 in the plane 4'. A further condition is that the area of the source of light is of homogeneous intensity at all points within the margins at which the origins of rays are indicated in dotted lines. Where it is desired to operate without loss of light at the rectangular window 4 in the plane 4', the effective area 1 also would have to be of rectangular shape corresponding to the shape of the window in the plane 4'.

This condition can be accomplished solely by lamps of special construction, and then even approximately only.

It is, however, well known that all of these primary illuminating devices have important inherent defects which become noticeable in enlarged size upon projection. Uniform illumination over the entire are of the window 4 is, therefore, attainable solely when the area 1 of the source of light is greatly over-dimensioned. The losses entailed in this reproduction method probably approach or even exceed 75 per cent. This means that considerably more electric energy must be used to make up for the defects, and this surplus production amounts to several million kilowatt hours per year in the theatrical field alone.

The suggestion of changing from illumination through a condenser to illumination through a mirror would not remedy this defect since the underlying causes for the losses are the same in all of the illuminating devices known up to now.

While, therefore, the illuminating assembly, as shown in Fig. 1, might possibly produce uniform illumination of the area of the picture window 4 if the area 1 of the source of light is of sufficient size and of highly uniform intensity, in the illuminating assembly of the present invention the uniformity of light in the picture window at 4 is independent of the condition affecting the intensity and size and uniformity of illumination in the area at 1.

One embodiment of the improved device is shown diagrammatically in Fig. 2. It comprises a source of light having an effective area indicated at 1, a compound condensing lens 2, 3, and a picture window 4, but the path of the rays of light is greatly modified owing to the interposition of two especially constructed and selectively disposed lens screens 5 and 6.

Each of these lens screens comprises a multiplicity of individual spherical lenses. The individual lenses are juxtaposed to abut without leaving any gaps between them, and are in such relation to each other that all lines 12 going from the centers of the individual lenses 5' of the lens screen 5 to the center points of the correspondingly disposed lenses 6' in the screen 6 intersect in the center of the window 4.

The focal length of the individual lenses 5' of the lens screen 5 is determined in such manner that the picture of the source area 1 reproduced primarily by the condenser 2, 3 within the window 4 is reproduced secondarily by means of these individual lenses 5' of the screen 5 within the lenses 6' of the screen 6. Hence, there are produced in the lens screen 6 numerous pictorial reproductions of the area 1 of the source of light, each located within one of the lenses of the lens screen 6. The focal length of the individual lenses 6' of the screen 6 is such that they produce pictures of the individual lenses 5' of the screen 5 within the area of the window 4. Within this area the pictures of the individual lenses 5' of the screen 5 register with each other, and the accuracy of their registering relation in the film window 4 is determined by the following factors: the general accuracy of manufacture of the lens screens themselves, the distance of the lens screens from each other, and the distances of the lens screens from the film window.

The size or area of the individual lenses 5' of the lens screen 5 is selected in such manner that the size of the picture of each of these individual lens screens produced within the window 4 is a uniform size, and that the pictures of each of the lenses 5' of screen 5 just cover the area of the picture window 4.

Now, since the "frame" of the individual image on the standard film is a rectangular frame, requiring a rectangular window 4 for projection, and since, furthermore, the pictures of lenses 5' are each to fill out this rectangular window, all of the individual lenses of the lens screen 5 should have rectangular configuration, and obviously should be practically of uniform size. Their number is so large that the rectangles abut forming horizontal rows and vertical columns without leaving any gaps.

It may be stated, therefore, that the optical equipment comprises in combination with a primary source of light, optical means for converting said primary source of light into a plurality of secondary sources of light, and optical means for projecting the light from all of said secondary sources in registering relation upon a single area in one plane.

Fig. 3 shows a plan view of a "window lens screen" 50. In this embodiment the rectangular individual lenses 5' are disposed in horizontal vertical rows and columns.

Fig. 4 shows a plan view of a similar window lens screen 51 in which the individual lenses are disposed in vertical columns without horizontal rows extending from side to side.

Fig. 5 shows a window lens screen 52 in which the horizontal row arrangement of lenses 5' is maintained while the columns have disappeared. In the two last named figures the lenses 5' of adjacent columns or rows respectively are offset by one-half the height or width respectively of the adjacent lens.

Where the effective area 1 of the sources of illumination is approximately a circular area, as for instance, the positive crater of an arc-light operated by direct current, the individual lenses 6' of the source screen 6 also are preferably circular, or approximately circular. Since, however, these individual lenses also should mutually abut without leaving any gaps, the most efficient approach to the circular form of the source area is for the lenses 6' an area of hexagonal shape, the individual lenses mutually abutting in a honeycomb arrangement.

Fig. 6 shows this construction of a lens screen 6 intended for reproducing the area of the source of light in the plane at 1.

Owing to this arrangement, the center of any lens 5' in the window lens screen 5, and the center of the corresponding lens 6' in the source lens screen 6 can be imagined to form end points of a straight line. The arrangement or mutual relation of the end points in one screen must be greatly similar to the relation of the end points in the other screen. The centers of the lenses on both screens can then be represented in their entirety by systems of dots which are correspondingly spaced from each other in each system. Inspection of the window lens screens illustrated in Figs. 3, 4 and 5 and comparison of the same with the source screen of Fig. 6 will show that a maximum correspondence as to relation of these center points of the lenses in both screens will be present when one of the screens has the lens arrangement as illustrated in Fig. 5, and the companion screen has the lens arrangement, as shown in Fig. 6.

Each individual lens of the source screen 6 creating within the body of the lens an image of the area 1 of the source of light will permit those rays only to pass to the picture window 4 which have passed through the corresponding individual lens 5' of the window lens screen 5. The images of the area 1 of the source of light, which images are located within the bodies of the individual lenses 6' of the lens screen 6 should not be greater in area than the areas of the individual lenses 6' themselves. Hence, it may be stated that the area of the source of illumination at 1 required for maximum illumination of the window 4 depends upon the area of the individual lens 6' of the lens screen 6, namely upon that area which a projection of lens 6' backwards into the plane of the source of illumination would occupy, assuming that this rearward projection of lens 6' is effected through that optical assembly of which it forms a part and which then would include a source of light in the plane of window 4, lens 5', and condenser 3, 2.

Inversely, however, this arrangement of elements might be employed in association with any smaller area of the source of light. In that case, the individual lenses 6' of the source lens screen 6 would not be illuminated each over its entire area; the lens images of the source of light, as produced in the lenses 6' would be separated from each other by non-illuminated gaps, or gaps free of these images. Since each individual lens 6', however, of the source lens screen 6 would produce a picture of the pertaining lens 5' of the window lens screen 5 in the window 4 with all of these pictures in registration superimposed in the plane of window 4, the uniformity of illumination of the window plane 4 is independent, therefore, of the size and shape of the area of the projecting source of light at 1.

The optimum illumination of the window 4 will be obtained whenever the shape of the individual lenses 6' in the source lens screen 6 corresponds to the shape of the effective area of the source of projecting light at 1, and when the size of the effective area 1 is the same as that of the projection of the image from each lens 6' backwards into the plane of the source of light at 1.

The efficiency of the entire system will become optimum efficiency when in addition to the described optimum illumination condition, the center points of the individual lenses 5' of the window lens screen 5 are spaced and angularly related identically with the spacing and angular relation of the center points of the individual lenses 6' of the source lens screen 6, because the sameness of these spacings and angular relations will then produce a gapless, non-overlapping reproduction of the images of window 4 within the plurality of lenses 5' in the window lens screen 5.

Fig. 7 illustrates diagrammatically at $a$ an embodiment of a portion of a window lens screen 5 by indicating a plurality of lenses 5'. In the same figure the relation of the center lines of the individual lenses 5' of this screen is indicated in part $b$ of the figure. The additional parts of the same figure, namely $c$, $d$, $e$ and $f$, show diagrammatically by way of example a plurality of different arrangements of lenses 61, 62, 63, 64 for source lens screens, in which the center points, indicated by dots, would have the same spacing and angular relation which in Fig. 7 is indicated at $b$ for the window lens screen lenses 5' of part $a$ of this figure. The arrangement, as shown in Fig. 7 at $e$ would seem to be the best possible arrangement if the area of the source of light at 1 is assumed to be a circular area.

The following mathematical relations must exist with respect to focal lengths and dimensions of the individual lenses of the two lens screens, with respect to the spacings of the lens screens from the picture window, as well as with respect to the size of the area of the window at 4.

Referring to Fig. 8, it will be noted that:

$A_1$ is the distance of the window lens screen 5 from the plane of the window at 4;

$A_2$ the distance of the source lens screen 6 from the plane of the window at 4;

$f_1$ may be assumed to be the focal length of the individual lenses of the source lens screen 5;

$f_2$ the focal length of the individual lenses of the source lens screen 6;

$d_1$ the spacing of center points of the individual lenses in the window lens screen 5 from each other;

$d_2$ the spacing of the center points of the individual lenses in source lens screen 6;

$D$ the diameter (or height or width) of the window in the plane at 4.

The following equations will then hold true:

$$f_1 = A_1 \times \frac{A_1 - A_2}{A_2} \qquad d_1 = D \times \frac{A_1 - A_2}{A_2}$$

$$f_2 = A_2 \times \frac{A_1 - A_2}{A_1} \qquad d_2 = D \times \frac{A_1 - A_2}{A_1}$$

For example:

$A_1 = 300$ mm. $\quad f_1 = 75$ mm. $\quad d_1 = 7.5$ mm.
$A_2 = 240$ mm. $\quad f_2 = 48$ mm. $\quad d_2 = 6.0$ mm.
$D = 30$ mm.

Until now, it had been assumed that this primary optical projection equipment produces an ideal or perfect picture of the center portion of the illuminating area within the center portion of the picture window. This condition, however, is not always fully met by those optical equipments which are in practical use. All of these optical systems operate with aberrations. The most important aberration for the present purposes would be the spherical aberration owing to which the center parts of the illuminating area indicated at 1 would not be reproduced through the lenses 5' of the window lens screen 5 in the exact center parts of the individual lenses 6' of the source lens screen 6.

As long as the illuminating area at 1 has a size small enough to permit the images of this area to be located entirely within the area of the individual lenses 6' of the source lens screen 6, the equipment will operate without any loss or defect.

If, however, the area of the source of light at 1 is greater, the spherical aberration will cause these images within lenses 6' to assume an eccentrical position of such value with respect to the centers of these lenses 6' that sections of these secondary illuminating areas are cut off by the boundary lines of the individual lenses 6', provided, of course, the individual lenses are of such construction that they are of symmetrical configuration with respect to the optical axis. It is, however, feasible to compensate for this loss in a very simple way. It is only necessary to locate the boundary lines of the individual lenses 6' of the source lens screen 6, so as to be non-symmetrical to the optical center of the lenses, but symmetrical to the center of the images of the area 1 produced in these lenses 6'. The geometrical center, therefore, may be selected spaced from the optical center of the individual lenses. This eccentric relation will depend largely upon the shape of the primary source of illumination, and this eccentricity will be in proportion to the closeness of the intersecting point of the rays to the center point of the window, at 4.

The area of the window at 4 will be, however, uniformly illuminated, practically without loss, even if the boundary lines should be symmetrical to the centers of the lenses, if the intersection of the rays producing the primary picture of the area of the source of light within the plane of the window 4 is attained by means of a marginal condenser zone.

Comparing Figs. 1 and 2, it will, furthermore, be seen that the addition of the two lens screens 5 and 6, leaves the outer surface of the light cone practically unaltered. The light cone having its apex X in the center of the window, at 4, Fig. 1, remains the same in Fig. 2, but in the latter figure it is now subdivided within its interior in a great number of "individual" light cones. These individual light cones are spaced from each other more or less depending upon the size and shape of the area of the illumination at 1. The areas of the bases of the individual cones are dependent upon the size of the images of the area of the light source, at 1, produced in the plane of the source lens screen 6.

The areal extent of the illumination of the window, at 4, is determined solely by that portion of the space which is filled with light and which is occupied by the sum total of the apex angles of the individual cones. The gradual modification of the intensity of the illumination over this area of the picture of the window, at 4, is determined by the direction of the rays of the individual cones. This condition makes it advisable to introduce two new definitions for describing the operation of the illuminating equipment of this invention.

The "envelope aperture" may be described as that aperture which for the center of the picture is determined by the outer surfaces of the individual cones and the interspaces between the same. In order to permit computations of the flow of light on the basis of this "envelope aperture", the actual intensity of illumination of the source of light has been replaced by a "mean luminous intensity" of the entire equipment, since as a source of light for the illumination of the window, at 4, the source lens screen 6 becomes effective in proportion to the illumination to which this source lens screen 6 itself is exposed.

The "mean luminous intensity" is, therefore, dependent not only on the intensity of the effective area of the source of projecting light, but also on the degree to which the areas of the individual lenses 6' of the lens screen 6 are occupied by images of this effective area. This "mean luminous intensity" will reach a maximum value when the individual lenses 6 of the source lens screen 6 are each illuminated over their entire area. Under this condition, the "mean luminous intensity" will be equal to the actual luminous intensity of the source of light. At the same time, however, the "enveloping aperture" will be completely filled with light, since the images of the source of light abut, and hence, the individual cones also contact each other.

The "mean luminous intensity" of the improved device for a certain "envelope aperture" must, therefore, always be equal to the intensity of the actual source of light reduced proportionally to the ratio of area of the image of the source 1 produced in the lens screen 6 to the area of the individual lenses 6' in the same lens screen.

Selecting by way of example an "envelope aperture" of 1:2.5, and assuming a maximum effective area of the source of light of 20 millimeter square, then with a luminous intensity of this source of light equal to 180 H. K. per millimeter square, the "mean luminous intensity" of the equipment will become equal to the actual luminous intensity of the source of light.

When the effective area of the source of light is reduced for instance to 10 millimeter square the "envelope aperture" still will remain 1:2.5. The "mean luminous density" of the entire structure, however, is now 90 H. K. per square millimeter only in the field of the picture.

It is apparent from the above that at a predetermined "envelope aperture" value, the structure remains operable for an effective area between zero and 20 millimeter square.

This new projecting device may be constructed for any desired "envelope structure" without requiring modification of the structure of the double lens screens. The "envelope aperture" will practically be the same as the "primary aperture" of the source of light used, which primary aperture is the aperture for directly projecting a picture of the effective area of the source of light into the plane of the picture window, at 4.

Any motion picture projector equipped with the projecting device described in the present specificaion will, therefore, be suitable for operation at a uniform "envelope aperture", as for instance, at the aperture value 1:2.5. These projectors can then be operated at any desired intensity of current, that is, at any size of the luminous area, at 1, delivering different fluxes of light. The rate at which the illumination in the projection picture varies is the same in all of the devices having the same "envelope aperture", and hence, all of the film copies may be reproduced uniformly.

If the projection area is small, thin carbon electrodes may be employed at low intensity of current. If the area of projection is larger, or when projecting colored films having reduced transparency, it will be necessary to employ heavier carbon electrodes and a correspondingly increased intensity of current in order to increase thereby the "mean luminous intensity" of the projecting device. If the maximum illumination has been attained by the means just described, but if still more severe conditions are to be met, the pure carbon electrodes may be replaced by carbon electrodes of especially high intensity and high primary luminous density. Even then, a non-intermittent variation of the flow of light from the projecting device is still feasible, as for instance by varying the area of the luminous area, at 1, which means that the diameter of the carbon electrodes and the intensity of the current will have to be adjusted accordingly.

This device, furthermore, provides for the possibility of carrying into effect in a simple way a mixture of light radiation emanating from the core of the crater and light radiation emanating from the margin of the crater with lamps of highest intensity, whereby a color shade lying between the color shades of both radiating elements is attainable.

Since shape and uniformity of the area of the source of light at 1 is immaterial, the new projector device also may be employed in association with sources of light not previously specifically referred to herein. Such sources of light, for instance, are incandescent projecting lamps, alternating current arc lamps, flaming arc lamps, mercury high pressure vapor lamps, etc. The structure also is usable in the same manner, whether the film to be projected is a film of standard dimensions or a narrower film or wider film, these deviations from the standard size of the film being taken care of by correspondingly shaping the individual lenses of the lens screens 5, 6.

In the above description of the improved device, a compound arrangement of lenses had been assumed to be used as the simplest device for primarily reproducing the area of the source of light in the window. It is obvious that any other illuminating devices may be utilized for directing light upon the picture window.

In place of ordinary condenser lenses, there have been suggested for motion picture projection: lamps having concave mirrors, and lamps which combine the concave mirror with condenser lenses. In systems making use of concave mirrors only or of a combination of concave mirrors with condenser lenses, the double lens screen, as shown in Fig. 2, may be used in an analogous manner.

Fig. 9 shows the system of the present invention in combination with a lamp illuminating the picture window by means of a concave reflector 55 wherein the effective area 1 of the source of light is properly reflected.

In Fig. 10 the system of the present invention utilizes a lamp making use of a concave mirror 56 as well as of a condenser lens 57 for illuminating the picture window, the double lens screen 5, 6 being interposed between the condenser lens 57 and the window at 4.

Fig. 11 shows a similar system utilizing a lamp having a concave mirror 58 and a condenser lens 59, in which, however, the double lens screen 5, 6 is interposed between the mirror and the lens.

The lens screens themselves may be constructed in various ways. It seems particularly useful to produce these lens screens from two plates of glass each having a plane face, while the opposite face shows the lenticular structure. Two of these plates of glass, each having the required shape of lenses may be combined to form the double lens screen of the present invention. An arrangement is practicable wherein a cooling tank is interposed between the source of light and the picture window, in which case the two lens screens may constitute the front and rear wall of the tank, the length of which in direction of the rays is selected in accordance with the desired spacing of the lens screens. Provision must be made for permitting adjustment of at least one lens screen in its plane relatively to the other. This plane adjustment can be accomplished with the manufacture of the lens screens when they form opposite faces of a heavy plate of glass interposed in the path of rays emanating from the source of light and having the lenticular structure pressed into it. The last named arrangement is particularly valuable in connection with films smaller than standard size.

It should, furthermore, be noted here that when leaving the shape of the area of the source of illumination unaltered, the same pair of lens screens may be employed for all projecting devices of this type, as long as this pair of lens screens maintains its proper spacing, and its proper location with respect to the film window itself.

When building the device for standard size film and for a predetermined shape of the luminous area of the source of light, and also for a fixed spacing of the lens screens from the film window, the device may then be used regardless of the other elements entering the construction of the lamp. The lamp may then be constructed as a projecting lamp with condenser lenses, a lamp with a concave mirror or a lamp with a concave mirror combined with a condenser lens. It is then immaterial whether the current intensity is high or low, whether the area of the illuminating source is a homogeneous area or non-homogeneous, and whether the aperture is large or small. Now, considering that the primary aperture of the device ordinarily remains the same for a standard size film regardless of the other conditions present in the device, then this projecting device of the present invention becomes a universal motion picture projector.

It is adapted in an ideal manner for all types of films, black and white, or color films or films having the pictures on lens screens, and it is solely necessary to adapt this ideal projecting lamp to the light requirements which may be taken care of simply by altering the current intensities or altering the diameters of the carbon electrodes respectively.

As will be seen from Figs. 2, 9 and 10, the rays of light with exception of the ray in the optical axis of the system pass at different angles through the lens screens, so that the length of these paths of the light vary. The length becomes greater, the closer to the margin of the lens screens the rays of light are located. As a result of this variation of the length, the images of the source of light for the lenses close to the margin of one lens screen are not produced upon the second lens screen. For the same reason the pictures of the lenses of the first screen are not reproduced accurately by the second screen.

The invention, therefore, also has the object of rendering uniform the length of the path of light between the two lens screens. A system of this character is illustrated in Fig. 12 in which the two lens screens are disposed on spherical surfaces, the spherical surface portions having a common center in the plane of the window of the picture. In this manner the disadvantages due to oblique rays of light through the system of lens screens is avoided.

In this Fig. 12, the source of light is indicated at 1 and the element for intensifying the illumination is shown as a concave mirror 62. The lens screens 63, 64 are constructed in this embodiment as portions of a sphere; the plane of the picture window wherein the center of both of these spheres is located is shown at 4, while the projector lens is indicated at 65.

It may also be advantageous to arrange the lenses for the screens upon a suitable optical element serving not only as carrier for the lenses but also performing an additional optical function. According to Fig. 13, the source of light again is indicated at 1 and the reflector at 67. This system also includes a condenser 68 co-operating with the reflector 67. The condenser is here constructed as a lens of plane convex curvature, and the plane face of the lens is constructed as a screen of lenses, while the second lens screen 69 may be disposed with an ordinary plane glass plate. The picture window is indicated at 4. The source of light 1 and the second lens screen 69 are located in two conjugated planes $a$, $a'$, while the condenser lens 3 also serving as first lens screen and the picture window 4 are located in the conjugated planes $b$, $b'$.

In these modified devices the angular relation of the rays between the center points of the individual lenses disposed on the lens screens are not varied. It should be noted, however, that in spite of this maintenance of direction, the lens screen arrangement loses frequently in its efficiency, for upon assuming a certain size of lenses in the plane of the first screen and assuming a certain spacing between the two lens screens, the area of the individual lenses in the second lens screen necessarily must be smaller than the area of the lenses of the first lens screen.

The bundle of illuminating rays passing to the first lens screen 5 from the illuminating element equipment shown here in the form of a concave mirror 80 is assumed to cover a maximum angle $\alpha$. Now, it can be seen quite clearly that this cone of light can be utilized fully only when the lenses of the second lens screen 6 are of sufficient size, to be enclosed by a single cone of the same angle.

Fig. 14 shows, however, that the angle $\beta$ only, namely an angle considerably smaller than angle $\alpha$, will cover the individual lens of screen 6. The light within angle $\alpha$ does not become fully effective on the second screen since a portion of this light strikes the second lens screen 82 beyond the boundary line of that lens on the screen 82 which is aligned with the corresponding lens on the first lens screen 81. This light that strikes the plane of the lens screen 82 outside the boundary line of the corresponding lens in said screen does not serve for the illumination of the window in the plane 4.

This defect, however, might be overcome by altering the angle of the light rays through optical refraction. Optical refractory elements 85, 86 are illustrated in Fig. 15 as being fixedly associated with the lens screens 83 and 84. They are shown as concave and convex lenses 85, 86, respectively. Owing to the refractory element 85 of the first lens screen 83, the rays of light which otherwise would emanate from this lens screen as converging rays now emanate as parallel rays or even as divergent rays. It is then feasible to provide the lens screen 84 with individual lenses of a size at least as great as the lenses on the screen 83. Owing to this alteration of the direction of rays passing through the first lens screen, the individual lenses in the second screen 84 may become of such size that the entire bundle of rays as defined by the angle $\alpha$ may be absorbed by a corresponding individual lens of the screen 84.

We claim:

1. An illuminating system for projectors comprising in combination a source of light, a picture window to be illuminated thereby, optical means for causing the rays of light emanating from said source to converge in direction towards the picture window, and lens screens spaced from each other between said source of light and said picture window, one of said screens having lenses of such focal length and being spaced from said source of light and from another lens screen to project an image of said source of light from each of its lenses into each corresponding lens of said other screen, and the other screen having lenses of such focal length and being spaced from the plane of the picture window to project by means of each of its lenses images of the lenses of the first named lens screen into the plane of the picture window in registration with each other, whereby within the plane of the picture window as many registering images of the source of light are produced as there are lenses on said first named screen.

2. An illuminating system for projectors comprising in combination a source of light, a picture window to be illuminated thereby, optical means for causing the rays of light emanating from said source to converge in direction towards the picture window and lens screens spaced from each other between said source of light and said picture window, one of said lens screens having lenses directly abutting against each other over the entire circumference of each lens, the lenses being of such focal length and the screen being spaced from said source of light and from another lens screen to project an image of said source of light from each of its lenses into each corresponding lens of said other screen and said other lens screen having its lenses in direct abutment with each other over the entire circumference of each lens, the lenses being of such focal length and the screen being spaced from the plane of the picture window such distance as to project by means of each of its lenses images of the lenses of said first named lens screen into the picture window, whereby within the plane of the picture window as many images of the source of light are produced as there are lenses on said first screen.

3. Illuminating system for projectors comprising in combination a source of light, a picture window to be illuminated thereby, optical means for causing the rays of light emanating from said source to converge in direction towards the picture window, and lens screens spaced from each other between said source of light and said picture window, one of said screens having lenses of such focal length and being spaced from said source of light and from another lens screen to project an image of said source of light from each of its lenses into each corresponding lens of said other screen and said other screen having lenses of such focal length and being spaced from the plane of the picture window to project from each of its lenses an image of a lens of the first named lens screen into the picture window, whereby within the plane of the picture window as many images of the source of light are produced as there are lenses on each of said screens, the several lenses on said lens screens being of different configuration in the two lens screens, the center points of the individual lenses on the first lens screen being disposed relatively to each other to form a group of points in predetermined angular relationship to each other and the center points of the several lenses on the second screens being disposed to form a group of points in which the points are of similar angular relationship to each other as the center points of said first screen.

4. Illuminating system for projectors comprising in combination a source of light, having an area of a certain configuration, a picture window to be illuminated by said source of light, optical means for causing the rays of light emanating from said source to converge in direction towards the picture window and lens screens spaced from each other between said source of light and said picture window, one of said screens having lenses of such focal length and being spaced from said source of light and from another lens screen to project an image of the area of said source of light from each of its lenses into each corresponding lens of said other screen, and the other lens screen having lenses of such focal length and being spaced from the plane of the picture window to project by means of each of its lenses images of the lenses of the first named lens screen into the plane of the picture window, whereby within the plane of the picture window as many images of the area of the source of light are produced as there are lenses on each of said screens, the lenses of said first named screen whose pictures are projected into the picture window having a configuration corresponding to that of the picture window and the lenses of said other screen and in which pictures of the area of the source of light are formed having a configuration corresponding to the configuration of the area of said source of light.

5. Illuminating system for projectors comprising in combination a source of light, a picture window to be illuminated thereby, optical means for causing the rays of light emanating from said source to converge in direction towards the picture window, and lens screens between said source of light and said picture window, one of said lens screens having lenses of such focal length and being spaced from said source of light and from another lens screen to project an image of said source of light into each corresponding lens of said other screen, and the other screen having lenses of such focal length and being spaced from the plane of the picture window to project images of the lenses of the first named lens screen into the plane of the picture window, whereby within the plane of the picture window as many images of the source of light are produced as there are lenses on said first named lens screen, the lenses on each of said screens being each of rectangular formation and the total lenses on each of the screens being arranged in vertical columns and intersecting horizontal rows.

6. Illuminating system for projectors comprising in combination a source of light, a picture window to be illuminated thereby, optical means for causing the rays of light emanating from said source to converge in direction towards the picture window, and lens screens interposed between said source of light and said picture window, one of said screens having lenses of such focal length and being spaced from said source of light and from another lens screen respectively to project an image of said source of light into each corresponding lens of said other screen and the other lens screen having lenses of such focal length and being spaced from the plane of the picture window to project an image of the lenses of the first named lens screen into the picture window, whereby within the picture window as many images of the source of light are produced as there are lenses on said first named lens screen, the lenses on each of such screens being each of rectangular configuration and being arranged on each screen in horizontal rows in abutment within each row, each row being in abutment with another row of lenses in which last named row the lenses are staggered relatively to the lenses of the first named row.

7. An illuminating system for projectors, comprising in combination a source of light, a picture window to be illuminated thereby, optical means for causing the rays of light from said source to converge in direction of said picture window, and lens screens interposed between said source of light and said picture window, one of said screens having lenses of such focal length and being spaced from said source of light and from another lens screen respectively to project an image of said source of light into each corresponding lens of said other screen, and the other screen having lenses of such focal length and being spaced from the plane of the picture window to project by means of each of its lenses images of the illuminated lenses of the first named lens screen into the plane of the picture window, whereby within the plane of the picture window as many images of the source of light are produced as there are lenses on said first named lens screen, the lenses on the lens screen illuminated by the source of light and whose lens images are projected into the picture window being of rectangular configuration and in direct abutment with each other over their entire circumference, and the lenses of the second lens screen into which a picture of the source of light is projected by the lenses of said first lens screen being of hexagonal configuration and being in abutment with each other over their entire circumference.

8. Illuminating system for projectors, comprising in combination a source of light, a picture window to be illuminated thereby, optical means for causing the rays of light emanating from said source to converge in direction towards the picture window, lens screens spaced from each other between said source of light and said picture window and an additional lens projecting a picture of the lens screen closer to the picture window forwardly of the picture window, one of said lens screens having lenses of such focal length and being spaced from said source of light and from another lens screen respectively to project an image of said source of light from each of its lenses into the corresponding lens of said other screen, and said other screen having lenses of such focal length and being spaced from the plane of the picture window to project images of the lenses of the first named screen into the plane of the picture window in registration with each other, whereby within the plane of the picture window as many registering images of the source of light are produced as there are lenses on said first screen, and whereby the projecting lens is additionally illuminated from said second lens screen.

9. Illuminating system for projectors, comprising in combination a source of light, a picture window to be illuminated thereby, optical means for causing the rays of light emanating from said source to converge in direction towards the picture window, lens screens spaced from each other between said source of light and said picture window, and additional light refracting means adapted to modify the convergency of the rays of light induced by said first named optical means, one of said lens screens having lenses of such focal length and being spaced from said source of light and from another lens screen respectively to project an image of said source of light from each of its lenses into each corresponding lens of said other screen, and said other screen having lenses of such focal length and being spaced from the plane of the picture window to project by means of each of its lenses images of the lenses of the first named lens screen into the plane of the picture window in registration with each other, whereby within the plane of the picture window as many registering images of the source of light are produced as there are lenses on said first named lens screen.

10. An illuminating system for projectors comprising in combination a source of light, a picture window to be illuminated thereby, optical means for causing the rays of light emanating from said source to converge in direction towards the picture window, lens screens spaced from each other between said source of light and the picture window, and additional optical elements on which said lens screens are mounted, said additional optical elements being adapted to vary the convergency of the rays of light induced by said first named optical means, one of said screens having lenses of such focal length and being spaced from said source of light and from another lens screen to project an image of said source of light from each of its lenses into each corresponding lens of said other screen, and said other screen having lenses of such focal length and being spaced from the plane of the picture window to project by means of its lenses images of the lenses of the first named lens screen into the plane of the picture window in registration with each other, whereby within the plane of the picture window as many registering images of the source of light are produced as there are lenses on said first named lens screen.

KURT RÄNTSCH.
HANS SAUER.
LUDWIG BERTELE.
ALFRED MERZ.